US012629993B2

(12) United States Patent
Miyanari et al.

(10) Patent No.: US 12,629,993 B2
(45) Date of Patent: May 19, 2026

(54) VEHICLE WITH A CAMERA TO CAPTURE AN IMAGE OF AN EXTERNAL ENVIRONMENT

(71) Applicant: HONDA MOTOR CO., LTD., Tokyo (JP)

(72) Inventors: Eitaro Miyanari, Tokyo (JP); Naoyuki Koguchi, Tokyo (JP); Makoto Tsukagoshi, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 326 days.

(21) Appl. No.: 18/402,055

(22) Filed: Jan. 2, 2024

(65) Prior Publication Data

US 2024/0317030 A1      Sep. 26, 2024

(30) Foreign Application Priority Data

Mar. 24, 2023     (CN) .......................... 202310297308.6

(51) Int. Cl.
B60J 1/20 (2006.01)
B60J 10/00 (2016.01)
B60R 1/24 (2022.01)

(52) U.S. Cl.
CPC ............. B60J 1/2094 (2013.01); B60J 10/45 (2016.02); B60R 1/24 (2022.01)

(58) Field of Classification Search
CPC ... B60R 1/24; B60R 11/04; B60R 2011/0026; B60J 1/02
See application file for complete search history.

(56) References Cited

U.S. PATENT DOCUMENTS

| | | | | |
|---|---|---|---|---|
| 12,035,056 | B2 * | 7/2024 | Nagashima | .......... H04N 13/239 |
| 12,296,557 | B2 * | 5/2025 | Davis | ...................... B32B 37/12 |
| 12,313,778 | B2 * | 5/2025 | Schmidt | ............... G01S 7/4813 |
| 2007/0216768 | A1 * | 9/2007 | Smith | ..................... B60R 11/04 |
| | | | | 348/118 |
| 2016/0144797 | A1 * | 5/2016 | Hoellt | .................... H04N 23/50 |
| | | | | 348/148 |
| 2019/0061481 | A1 * | 2/2019 | Kagaya | ...................... B60J 1/00 |
| 2020/0079185 | A1 * | 3/2020 | Kondo | .................... B32B 27/36 |
| 2020/0391698 | A1 * | 12/2020 | Fukuda | ................ G01S 7/4813 |
| 2020/0398646 | A1 * | 12/2020 | Mujcinovic | ....... B32B 17/10761 |
| 2022/0314935 | A1 | 10/2022 | Kochi et al. | |
| 2022/0324388 | A1 * | 10/2022 | Ouspenski | ................ B60R 1/30 |
| 2022/0347974 | A1 * | 11/2022 | Sadakane | .................. B32B 3/08 |
| 2023/0093219 | A1 * | 3/2023 | Ichida | ..................... B60R 1/001 |
| | | | | 219/203 |
| 2023/0345092 | A1 * | 10/2023 | Nagashima | ............. B60R 11/00 |

(Continued)

FOREIGN PATENT DOCUMENTS

| | | | |
|---|---|---|---|
| JP | 2021004024 A | * | 1/2021 |
| JP | 2022155823 A | | 10/2022 |

*Primary Examiner* — Jason D Shanske
(74) *Attorney, Agent, or Firm* — Armstrong Teasdale LLP

(57) ABSTRACT

A vehicle includes a front window and a camera disposed on a cabin side of the front window to capture an image of an external environment through the front window. The front window includes: a first window panel fitted into a window frame of a vehicle body; and a second window panel formed as a separate member from the first window panel and disposed in an area including a region inside a field of view of the camera. The second window panel has different properties from the first window panel.

6 Claims, 9 Drawing Sheets

(56)            References Cited

U.S. PATENT DOCUMENTS

| | | | |
|---|---|---|---|
| 2024/0009966 A1* | 1/2024 | Yavari | B32B 17/10293 |
| 2024/0317027 A1* | 9/2024 | Miyanari | B60J 1/002 |
| 2024/0317029 A1* | 9/2024 | Silvestrini | B60J 1/02 |
| 2025/0091325 A1* | 3/2025 | Tokiwa | B32B 17/10761 |
| 2025/0305885 A1* | 10/2025 | Jobert | G01J 5/0875 |

\* cited by examiner when completed during assembly when completed during assembly when completed during assembly

VEHICLE WITH A CAMERA TO CAPTURE AN IMAGE OF AN EXTERNAL ENVIRONMENT

TECHNICAL FIELD

The present invention relates to a vehicle provided with a camera disposed on a cabin side of a front window to capture an image of an external environment through the front window.

BACKGROUND ART

In recent years, efforts have been made to provide access to sustainable transportation systems that take into account in vulnerable situations among traffic participants. To achieve this, research and development are focused on further improving the safety and convenience of traffic through research and development related to preventive safety technology.

Some vehicles are provided with a camera to capture an image of an area in front of the vehicle for purposes such as external environment recognition for driving assistance. JP2022-155823A discloses a technology in which a camera is disposed on a cabin side of an upper portion of a front window to capture an image of an external environment through the front window.

The front window is equipped with various functions for purposes such as ensuring the view and comfort of the occupants of the vehicle as well as the aesthetic appearance of the vehicle. For example, the front window is equipped with a function of reducing infrared and ultraviolet light entering the cabin. Also, when a head-up display (HUD) for projecting driving assistance information on the front window is provided, the front window is equipped with a function of enhancing the visibility of the projected image. However, such functions given to the front window may lower the accuracy of external environment recognition based on the captured image obtained by the camera.

SUMMARY OF THE INVENTION

In view of such background, a primary object of the present invention is to provide a vehicle which can ensure the accuracy of external environment recognition based on the captured image obtained by the camera without compromising the functions required of the front window, such as ensuring the view and comfort of the occupants of the vehicle as well as the aesthetic appearance of the vehicle. Also, the present invention aims to improve the vehicle control stability by ensuring the accuracy of external environment recognition based on the captured image obtained by the camera, further improving the traffic safety and contributing to the development of a sustainable transportation system.

To achieve the above object, one aspect of the present invention provides a vehicle, comprising a front window (4) and a camera (5) disposed on a cabin side of the front window to capture an image of an external environment through the front window, wherein the front window comprises: a first window panel (11) fitted into a window frame of a vehicle body; and a second window panel (12) formed as a separate member from the first window panel and disposed in an area including a region inside a field of view of the camera, wherein the second window panel has different properties from the first window panel.

According to this aspect, it is possible to ensure the accuracy of external environment recognition based on the captured image obtained by the camera without compromising the functions required of the front window, such as ensuring the view and comfort of the occupants of the vehicle as well as the aesthetic appearance of the vehicle.

Preferably, the second window panel has different light transmission properties from the first window panel.

According to this aspect, since the light transmission properties, namely, the properties of limiting transmission of light at specific wavelengths (for example, infrared and ultraviolet light) by at least one of absorption and reflection, are different between the second window panel and the first window panel, it is possible to achieve the functions required of the front window while ensuring the accuracy of external environment recognition based on the captured image obtained by the camera. Note that the second window panel may have different light reflection properties from the first window panel. For example, the first window panel may have reflection properties that enhance the visibility of the projected image of an HUD, while the second window panel may not have reflection properties that enhance the visibility of the projected image.

Preferably, the first window panel has a low transmittance of light at specific wavelengths, and the second window panel has a high transmittance of light at the specific wavelengths.

According to this aspect, the first window panel can reduce light at specific wavelengths (for example, infrared and ultraviolet light) intruding into the cabin for purposes such as ensuring the comfort of the occupants and protecting the bodies of the occupants. Also, the second window panel can avoid lowering of the accuracy of external environment recognition based on the captured image obtained by the camera.

Preferably, the vehicle further comprises a filling member (24) closing a gap between the first window panel and the second window panel.

According to this aspect, the first window panel and the second window panel can be coupled properly. In this case, the filling member may be formed by injecting a filler (putty) between the first window panel and the second window panel during assembly and curing the injected filler, or may be pre-molded from rubber material and interposed between the first window panel and the second window panel during assembly.

Preferably, the vehicle further comprises a holding member (7) that holds the camera to fix the camera to the vehicle body, wherein the second window panel is united with the first window panel together with the holding member.

According to this aspect, the second window panel can be properly fixed to the first window panel and the vehicle body together with the camera.

Preferably, the holding member is fixed to both of the first window panel and the second window panel.

According to this aspect, the second window panel can be stably fixed to the first window panel and the vehicle body together with the camera.

Preferably, the holding member is fixed to the second window panel, and is fixed to the first window panel via the second window panel.

According to this aspect, the second window panel can be easily assembled to the first window panel and the vehicle body together with the camera. In this case, the holding member may be fixed to the roof part of the vehicle body.

Preferably, the vehicle comprises, as the holding member, a first holding member (51) fixed to the first window panel and a second holding member (52) fixed to the second window panel, wherein the first holding member and the second holding member are joined and fixed to each other so that the first window panel and the second window panel are united with each other.

According to this aspect, the second window panel can be stably fixed to the first window panel and the vehicle body together with the camera.

Preferably, light shielding layers (15, 16) are formed on a part of the first window panel adjacent to the second window panel and a part of the second window panel excluding the region inside the field of view.

According to this aspect, since the area around the connection part between the first window panel and the second window panel is covered with the light shielding layer, the connection part between the first window panel and the second window panel is inconspicuous. Note that the light shielding layer may be made of black ceramic, for example.

Effect of the Invention

According to the foregoing configuration, it is possible to ensure the accuracy of external environment recognition based on the captured image obtained by the camera without compromising the functions required of the front window, such as ensuring the view and comfort of the occupants of the vehicle as well as the aesthetic appearance of the vehicle.

DETAILED DESCRIPTION OF THE INVENTION

First Embodiment

In the following, a first embodiment of the present invention will be described with reference to FIGS. 1 to 4B. The arrow Fr in FIG. 1 indicates the forward direction of the vehicle 1.

Figure 1:
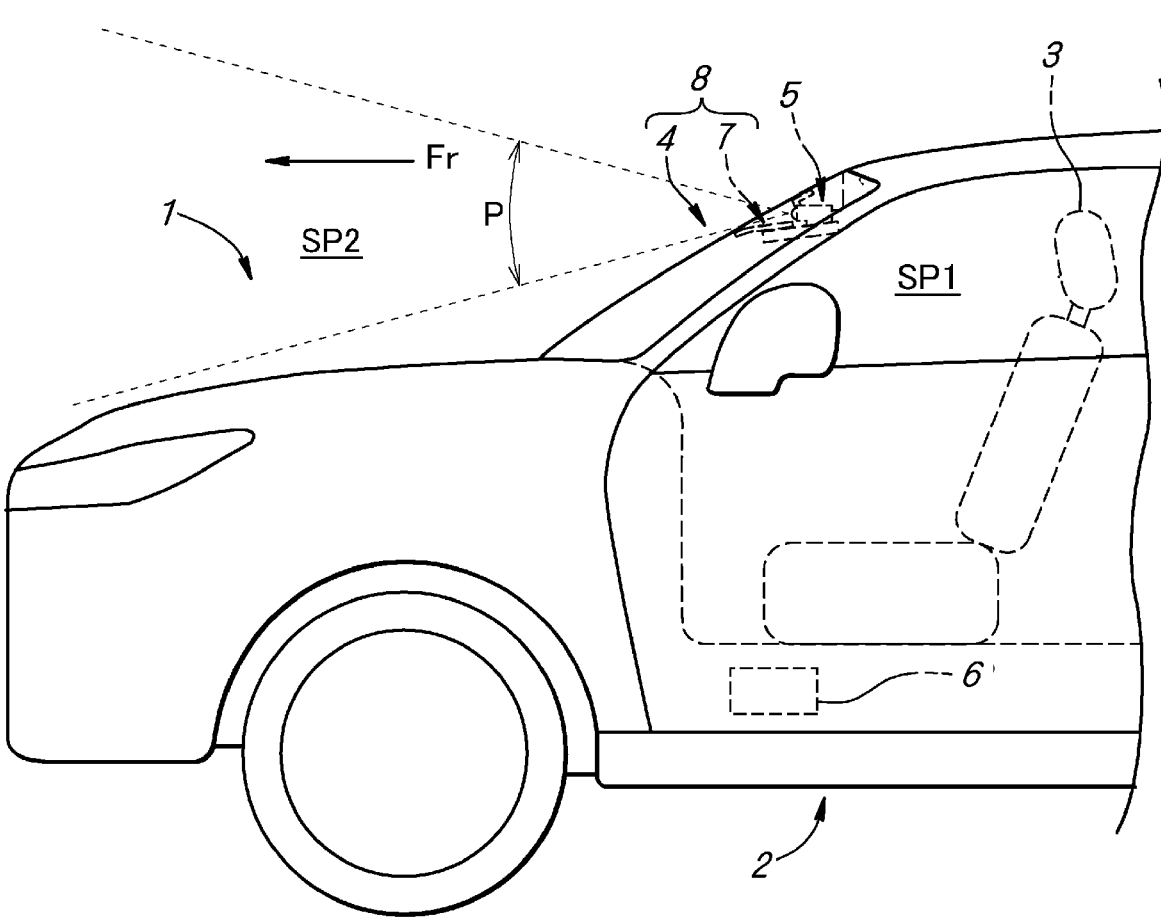
FIG. 1 is a side view showing a front portion of a vehicle according to the first embodiment.

As shown in FIG. 1, the vehicle 1 is a four-wheeled automobile. The vehicle 1 includes a vehicle body 2 elongated in the front-rear direction. A vehicle interior space SP1 is defined inside the vehicle body 2, and multiple seats 3 are provided in a central part of the vehicle interior space SP1 in the front-rear direction.

In a front portion of the vehicle 1, a front window 4 (an example of a window) is provided in front of the multiple seats 3. The front window 4 partitions the vehicle interior space SP1 from a vehicle exterior space SP2 (in the present embodiment, the space in front of the vehicle 1). The front window 4 is inclined rearward toward the top.

Behind an upper portion of the front window 4, a front camera 5 (an example of a vehicle-mounted camera) is provided. The front camera 5 captures an image of the vehicle exterior space SP2 (external environment) from the side of the vehicle interior space SP1 (cabin) through the front window 4. For example, the front camera 5 is a digital camera using a solid imaging element such as a CCD or CMOS. The front camera 5 is connected to a controller 6. The controller 6 is configured to perform advanced driver assistance control (for example, lane keeping control or preceding vehicle following control) of the vehicle 1 based on the image data transmitted from the front camera 5.

The controller 6 performs external environment recognition to recognize the positions of objects present in the vehicle exterior space SP2 (for example, obstacles and delimiting lines on the traveling path of the vehicle 1) based on the detection result of an external environment sensor such as the front camera 5. For example, the controller 6 recognizes the positions of the objects present in front of the vehicle 1 by analyzing the change in the density value on the image captured by the front camera 5.

A bracket 7 (an example of a holding member) for holding the front camera 5 is fixed to the inner surface (namely, the surface on the side of the vehicle interior space SP1) of the front window 4. The bracket 7 constitutes a camera holding structure 8 jointly with the front window 4. Note that an arrow P in FIG. 1 indicates the range of the field of view (image capturing range) of the front camera 5.

The front window 4 is equipped with a function of reducing infrared and ultraviolet light intruding into the cabin. Due to this function, it is possible to ensure the comfort of the occupants of the vehicle and to protect the bodies of the occupants. On the other hand, since the transmittance on the red side is low, there is a possibility that the external environment recognition based on the captured image obtained by the front camera 5 may be obstructed and the accuracy thereof may be lowered. For example, there is a possibility that in the control of an automatic high beam (AHB) system, an adaptive driving beam (ADB) system or the like, the recognition of the brake lights of the preceding vehicle may be affected. Also, since the transmittance on the blue side is also lowered, the colors of the objects appearing in the captured image obtained by the front camera 5 become different from the actual colors, and this can affect the performance of recognizing the objects.

Further, the front window 4 is equipped with a function of enhancing the visibility of the projected image of a head-up display (HUD) for projecting driving assistance information on the front window 4. The front window 4 is composed of a laminated glass having a so-called wedge interlayer. Due to this function, the driver can properly see and recognize the driving assistance information projected on the front window 4. On the other hand, the wedge interlayer is thicker than an ordinary interlayer, and the thickness of the interlayer can affect the external environment recognition based on the captured image obtained by the front camera 5. Therefore, to properly conduct the control using the captured image obtained by the front camera 5, it is necessary to make different adjustments according to presence or absence of the wedge interlayer.

Figure 2:
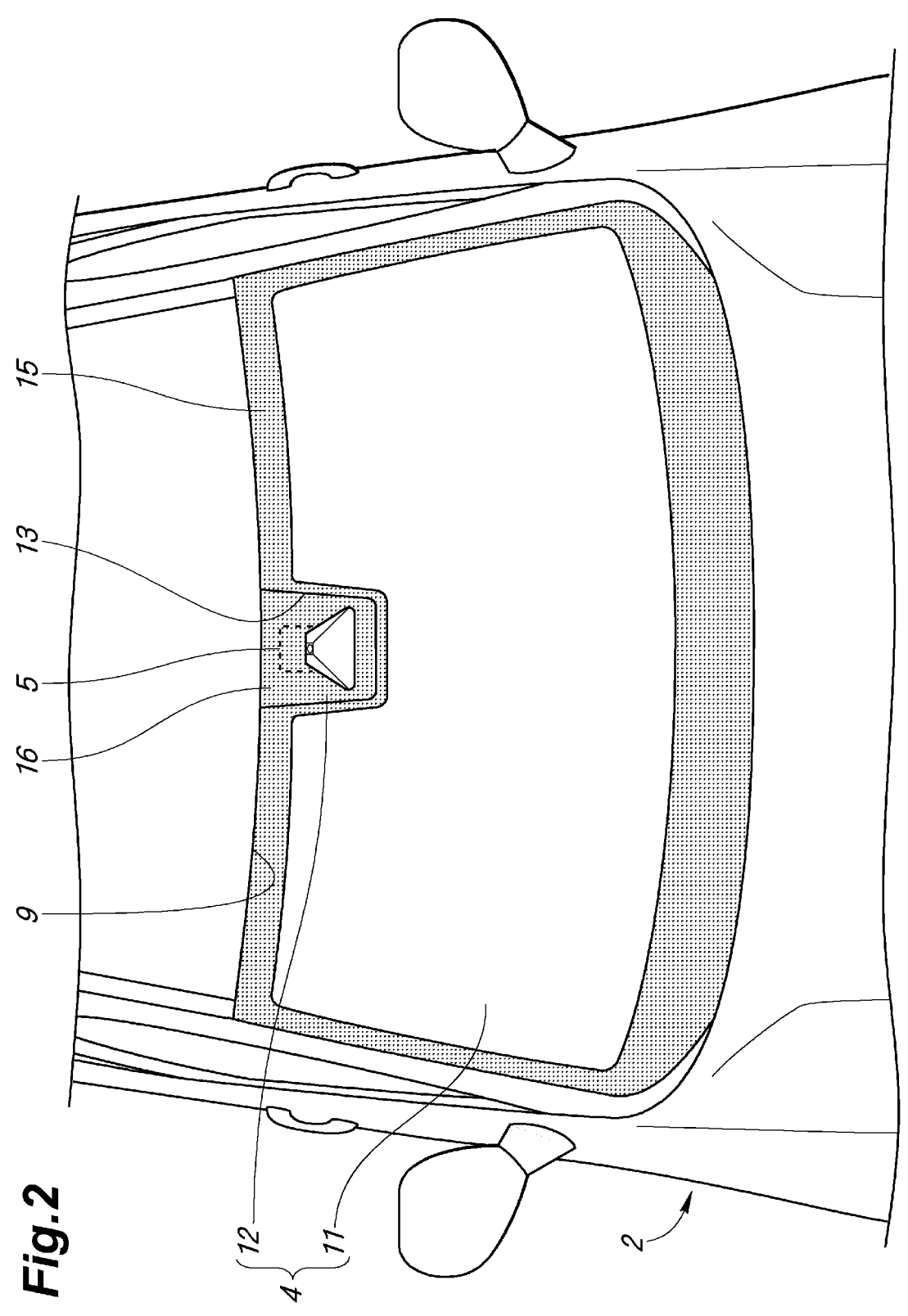
FIG. 2 is a perspective view showing the front portion of the vehicle according to the first embodiment.

In the present embodiment, as shown in FIG. 2, the front window 4 is configured to include a first window panel 11 fitted into a window frame 9 (frame) of the vehicle body 2 and a second window panel 12 formed as a separate member from the first window panel 11 and disposed in an area including the region inside the field of view of the front camera 5. The first window panel 11 is formed with a recessed part 13 in the area including the region inside the field of view of the front camera 5, and the second window panel 12 is provided to fill the recessed part 13. Thereby, it is possible to ensure the accuracy of the external environment recognition based on the captured image obtained by the front camera 5 without compromising the functions required of the front window 4.

Figure 3:
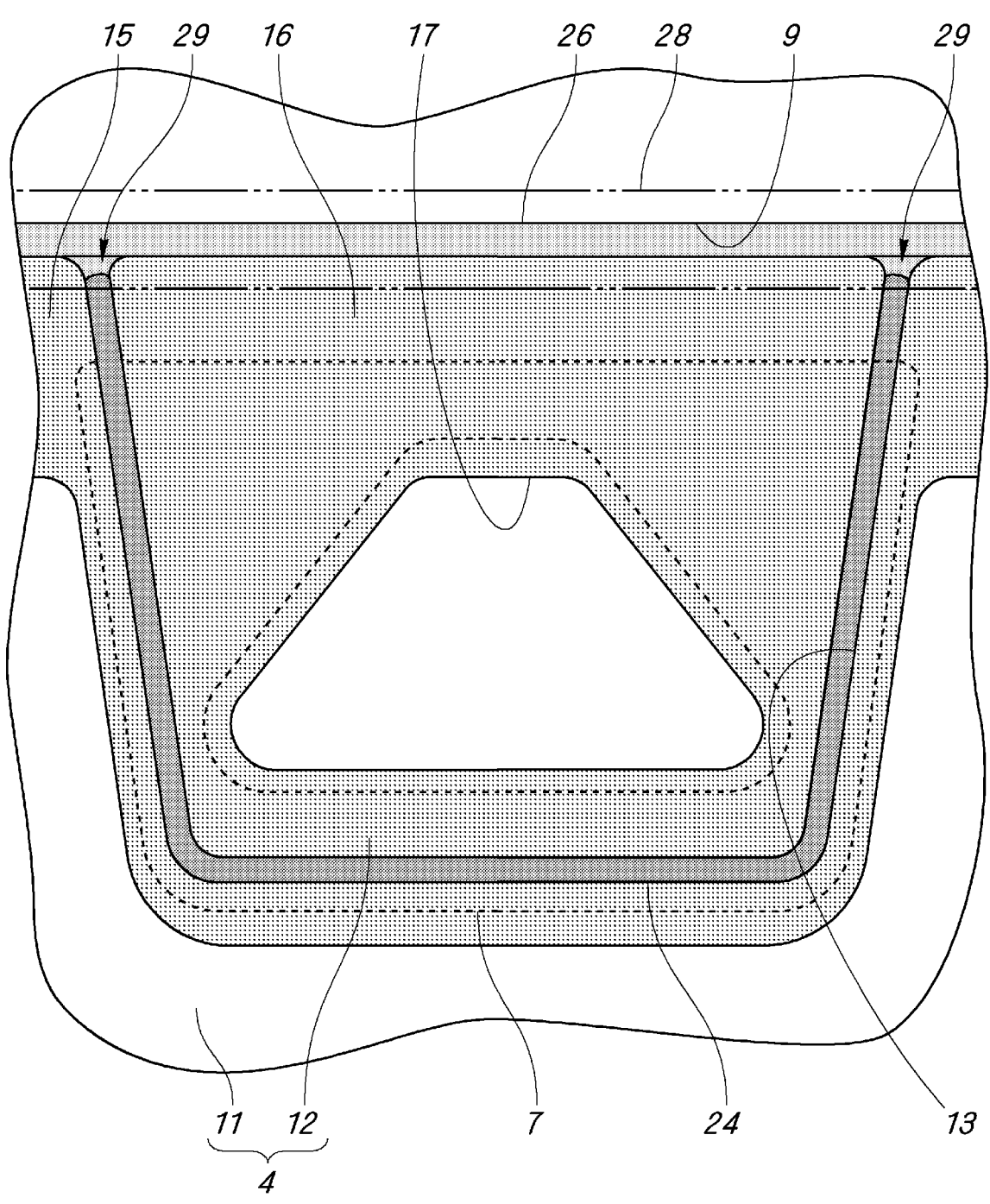
FIG. 3 is a front view showing a main part of a front window of the vehicle according to the first embodiment.
Figure 4A:
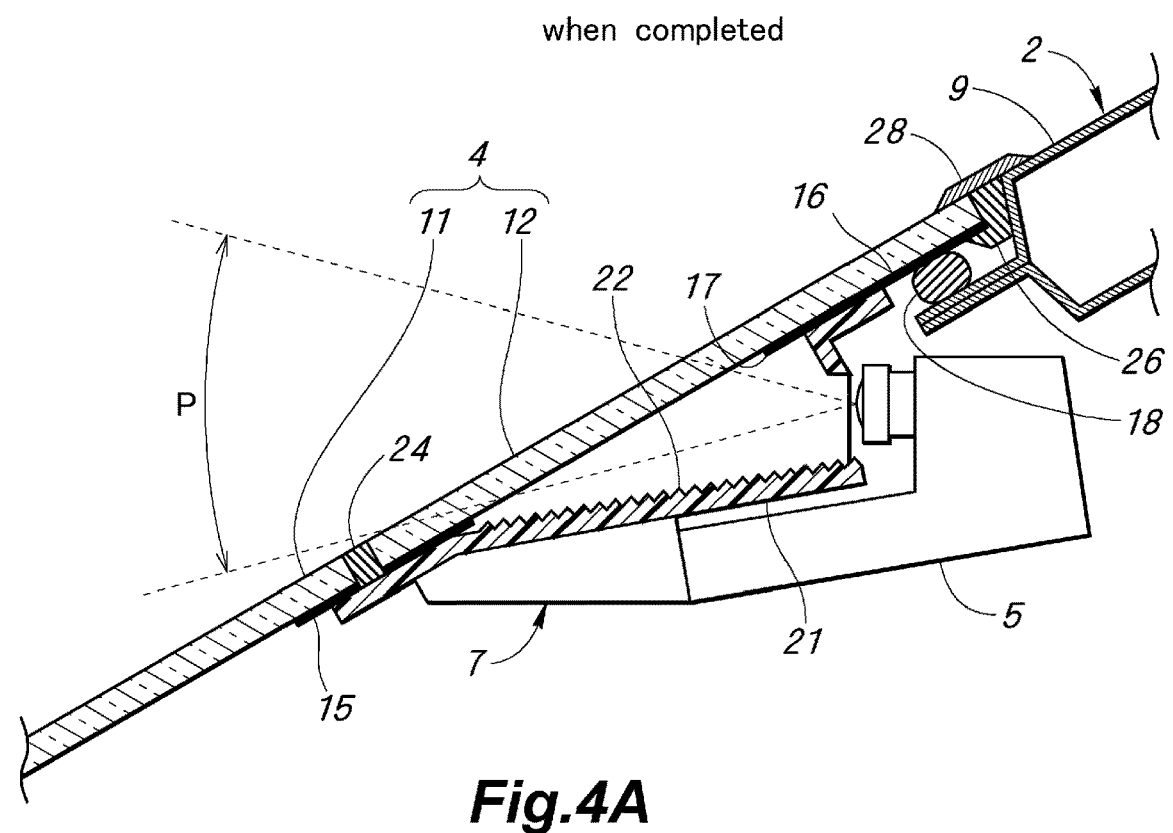
FIGS. 4A and 4B are sectional views showing a main part of the front window of the vehicle according to the first embodiment when completed and during assembly, respectively.

As shown in FIGS. 3 and 4A, the bracket 7 holds the front camera 5 and fixes the front camera 5 to the vehicle body 2. The bracket 7 is fixed to the inner surfaces of both of the first window panel 11 and the second window panel 12.

Figure 4B:
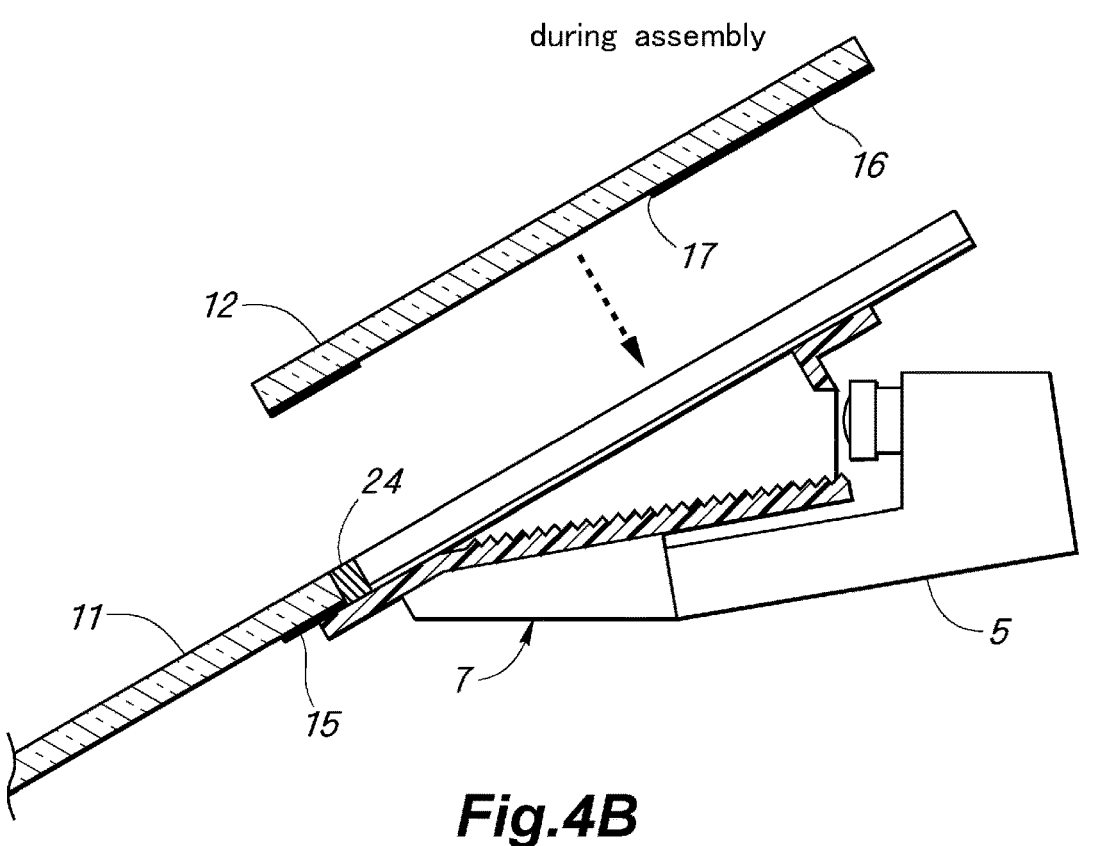

As shown in FIG. 4B, at the time of assembly, first, the bracket 7 is fixed to the inner surface of the first window panel 11, and then the second window panel 12 is fixed to the first window panel 11 and the bracket 7 which are united with each other. At this time, the bracket 7 may be fixed to the first window panel 11 and the second window panel 12 with an adhesive agent, for example. Thereby, the second window panel 12 is united with the first window panel 11 together with the bracket 7.

As shown in FIG. 4A, the bracket 7 includes a hood part 21 defining the range P of the field of view of the front camera 5. The hood part 21 is provided with a stray light suppression structure 22 (also referred to as a stray light shield (SLS)) for suppressing the stray light (reflection light) entering the lens of the front camera 5. The stray light suppression structure 22 is composed of multiple ridges arranged continuously in the front-rear direction, for example. Each ridge has an inverted V-shaped cross section and extends linearly in the left-right direction, for example.

The first window panel 11 is composed of a laminated glass having a structure in which an interlayer made of polyvinyl butyral (PVB), for example, is sandwiched between two sheets of glass. In the first window panel 11, an interlayer having properties of absorbing and/or reflecting light at specific wavelengths (for example, infrared and ultraviolet light) is used, whereby a function of reducing light at specific wavelengths intruding into the cabin is realized. Also, when an interlayer having sound insulation properties is used, it is possible to reduce the noise intruding into the cabin. Further, the first window panel 11 may be composed of a laminated glass including a wedge interlayer, whereby the function of enhancing the visibility of the projected image of the HUD is realized.

On the other hand, the second window panel 12 has different properties from the first window panel 11 so that the affect on the external environment recognition based on the captured image obtained by the front camera 5 is reduced.

For example, the second window panel 12 has different light transmission properties from the first window panel 11. Namely, while the first window panel 11 has a structure for lowering the transmittance of light at specific wavelengths, the second window panel 12 has a structure that does not lower the transmittance of light at specific wavelengths.

Consequently, the second window panel 12 has a higher transmittance of light at specific wavelengths than the first window panel 11. The first window panel 11 is required to have a function of reducing light at specific wavelengths (for example, infrared and ultraviolet light) intruding into the cabin for purposes such as ensuring the comfort of the occupants and protecting the bodies of the occupants, but such a function is not necessarily required of the second window panel 12. Therefore, the second window panel 12 may be composed of a laminated glass having a structure that does not lower the transmittance of light at specific wavelengths (specifically, a laminated glass provided with an interlayer that does not have properties of absorbing and/or reflecting light at specific wavelengths) or a single-layer glass without an interlayer.

Note that the second window panel 12 may be configured to have properties of absorbing and/or reflecting ultraviolet light but not to have properties absorbing and/or reflecting infrared light. Thereby, it is possible to prevent the temperature of the front camera 5 from rising due to irradiation of infrared light on the front camera 5.

Also, the second window panel 12 may have different light reflection properties from the first window panel 11. For example, the first window panel 11 is required to be equipped with the function of enhancing the visibility of the projected image of the HUD, but the second window panel 12 does not need to have such a function. Therefore, for example, the second window panel 12 may be composed of a laminated glass provided with an interlayer not including a wedge interlayer. Also, the second window panel 12 may be composed of a single-layer glass without an interlayer.

Note that inorganic glass such as soda glass may be used as the base material of the first window panel 11 and the second window panel 12, but rigid, transparent synthetic resin material (so-called organic glass) may be used. It is possible that soda glass is used as the base material of the first window panel 11, while inorganic glass other than soda glass is used as the base material of the second window panel 12. It is also possible that inorganic glass is used as the base material of the first window panel 11, while organic glass is used as the base material of the second window panel 12.

As shown in FIG. 2, the first window panel 11 is formed with a light shielding layer 15 on the inner surface of an outer peripheral portion thereof. Also, as shown in FIG. 3, the light shielding layer 15 is formed to cover a part of the first window panel 11 adjacent to the second window panel 12. On the other hand, the second window panel 12 is formed with a light shielding layer 16 on the inner surface of a part thereof excluding the region inside the field of view of the front camera 5. The light shielding layer 16 formed on the second window panel 12 is formed with a trapezoidal opening 17 in the region inside the field of view of the front camera 5.

As shown in FIGS. 4A and 4B, the light shielding layer 15 has a role of protecting a sealer 18 (adhesive agent) for fixing the first window panel 11 to the window frame 9 against ultraviolet light from outside the vehicle and thereby enhancing the durability of the sealer 18 and a role of hiding the sealer 18 so as not to be viewed from outside the vehicle and thereby enhancing the aesthetic appearance. Also, since the area around the connection part between the first window panel 11 and the second window panel 12 is covered with the light shielding layers 15, 16, the connection part between the first window panel 11 and the second window panel 12 is inconspicuous.

The bracket 7 is fixed to the part of the first window panel 11 where the light shielding layer 15 is formed and to the part of the second window panel 12 where the light shielding layer 16 is formed. Thus, the parts where the bracket 7 is fixed to the first window panel 11 and the second window panel 12 are covered by the light shielding layers 15, 16 and are not viewable from outside the vehicle, and this also contributes to enhancing the aesthetic appearance. Note that an adhesive agent may be used to fix the bracket 7.

Note that the light shielding layers 15, 16 may be formed by printing black ceramic, for example. Also, the light shielding layers 15, 16 may be formed as a laminate structure in which a black ceramic layer is sandwiched by two sheets of glass, for example.

Here, it is to be noted that when manufacturing the front window 4, the temperature of the parts where the light shielding layers 15, 16 are formed is lowered more quickly compared to the parts where the light shielding layers 15, 16 are not formed, and this can cause a distortion in the trapezoidal opening 17. This distortion can affect the external environment recognition based on the captured image obtained by the front camera 5, and thus, difficult temperature management is necessary to reduce the distortion. On the other hand, in the present embodiment, since the second window panel 12, which has the opening 17 formed in the light shielding layer 16, is a separate member from the first window panel 11, the difficulty in the temperature management is alleviated.

As shown in FIG. 3, a filling member 24 is provided to close the gap between the periphery of the recessed part 13 of the first window panel 11 and the periphery of the outer circumference of the second window panel 12. The filling member 24 is formed by injecting a filler (putty) between the first window panel 11 and the second window panel 12 during assembly and curing the filler. The filling member 24 is made of highly flexible, elastic material (for example, rubber material). Thereby, the first window panel 11 and the second window panel 12 can be properly coupled while permitting deformation of the first window panel 11 and the second window panel 12 due to temperature change or the like. Note that the filling member 24 may be pre-molded into a shape suitable for closing the gap between the periphery of the recessed part 13 of the first window panel 11 and the periphery of the outer circumference of the second window panel 12 and be interposed between the first window panel 11 and the second window panel 12 during assembly.

As shown in FIG. 3, the upper edge of the second window panel 12 is fixed to the window frame 9 similarly to the upper edge of the first window panel 11. A window molding 26 is provided between the window frame 9 and the first window panel 11 and between the window frame 9 and the second window panel 12. The window molding 26 is pre-molded from rubber material and is interposed between the window frame 9 and the first window panel 11 and between the window frame 9 and the second window panel 12 during assembly. Note that as shown in FIG. 4A, the first window panel 11 and the second window panel 12 are fixed to the window frame 9 by the sealer 18.

As shown in FIG. 3, a garnish 28 is provided on the upper edges of the first window panel 11 and the second window panel 12. Each corner part of the first window panel 11 and the second window panel 12 is chamfered with a predetermined radius. As a result, a gap 29 is formed at each upper end of the connection part between the first window panel 11 and the second window panel 12. The garnish 28 mounted to close the gaps 29 from outer side can prevent intrusion of foreign matters such as water. Note that the upper edge parts of the first window panel 11 and the second window panel 12 may be inserted into the window frame 9 to hide the gaps 29.

Modification

Figure 5:
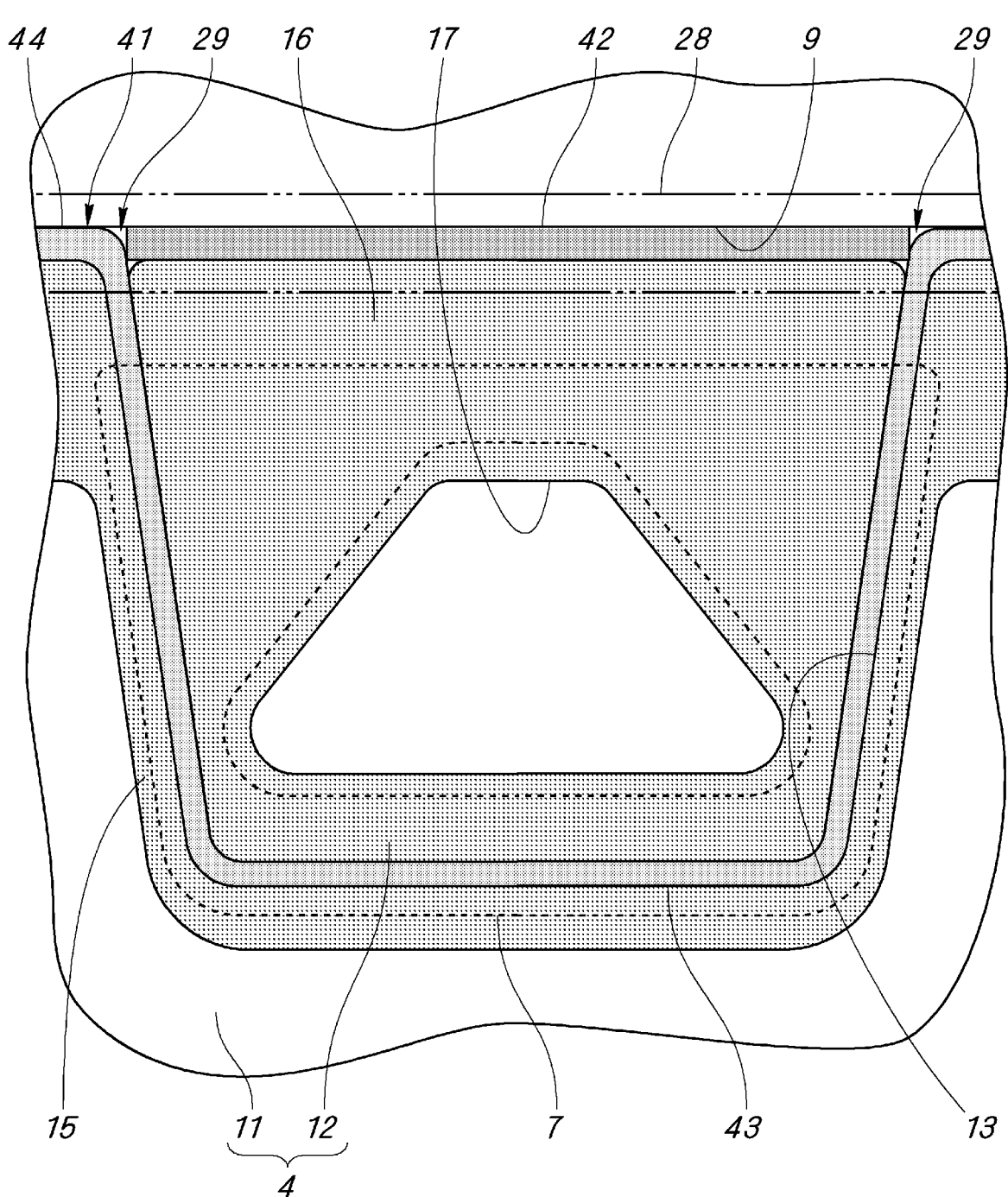
FIG. 5 is a front view showing a main part of the front window of the vehicle according to a modification of the first embodiment.

As shown in FIG. 5, in a modification, a first window molding 41 and a second window molding 42 are provided. Similarly to the window molding 26 of the first embodiment (see FIG. 3), the first window molding 41 is provided between the first window panel 11 and the window frame 9 (frame). The second window molding 42 is provided between the second window panel 12 and the window frame 9.

The first window molding 41 also functions as the filling member 24 (see FIG. 3) of the first embodiment. Namely, the first window molding 41 is integrally formed with a U-shaped filling part 43 that is interposed between the first window panel 11 and the second window panel 12. The first window molding 41 is pre-molded from rubber material into a predetermined shape, and is inserted between the first window panel 11 and the window frame 9 during assembly, except that the filling part 43 is interposed between the first window panel 11 and the second window panel 12. The filling part 43 may be fixed to the first window panel 11 and the second window panel 12 with an adhesive agent, for example.

In the first window molding 41, a part 44 interposed between the first window panel 11 and the window frame 9 and the U-shaped filling part 43 interposed between the first window panel 11 and the second window panel 12 are integrally formed, whereby the sealability (waterproofness), etc. can be improved.

Note that a gap 29 is formed at each upper end of the connection part between the first window panel 11 and the second window panel 12, but similarly to the first embodiment (see FIG. 3), the garnish 28 mounted to close the gaps 29 from outer side can prevent intrusion of foreign matters such as water. Also, the upper edge parts of the first window panel 11 and the second window panel 12 may be inserted into the window frame 9 to hide the gaps 29.

Second Embodiment

Next, with reference to FIGS. 6 to 7B, a second embodiment of the present invention will be described.

Figure 6:
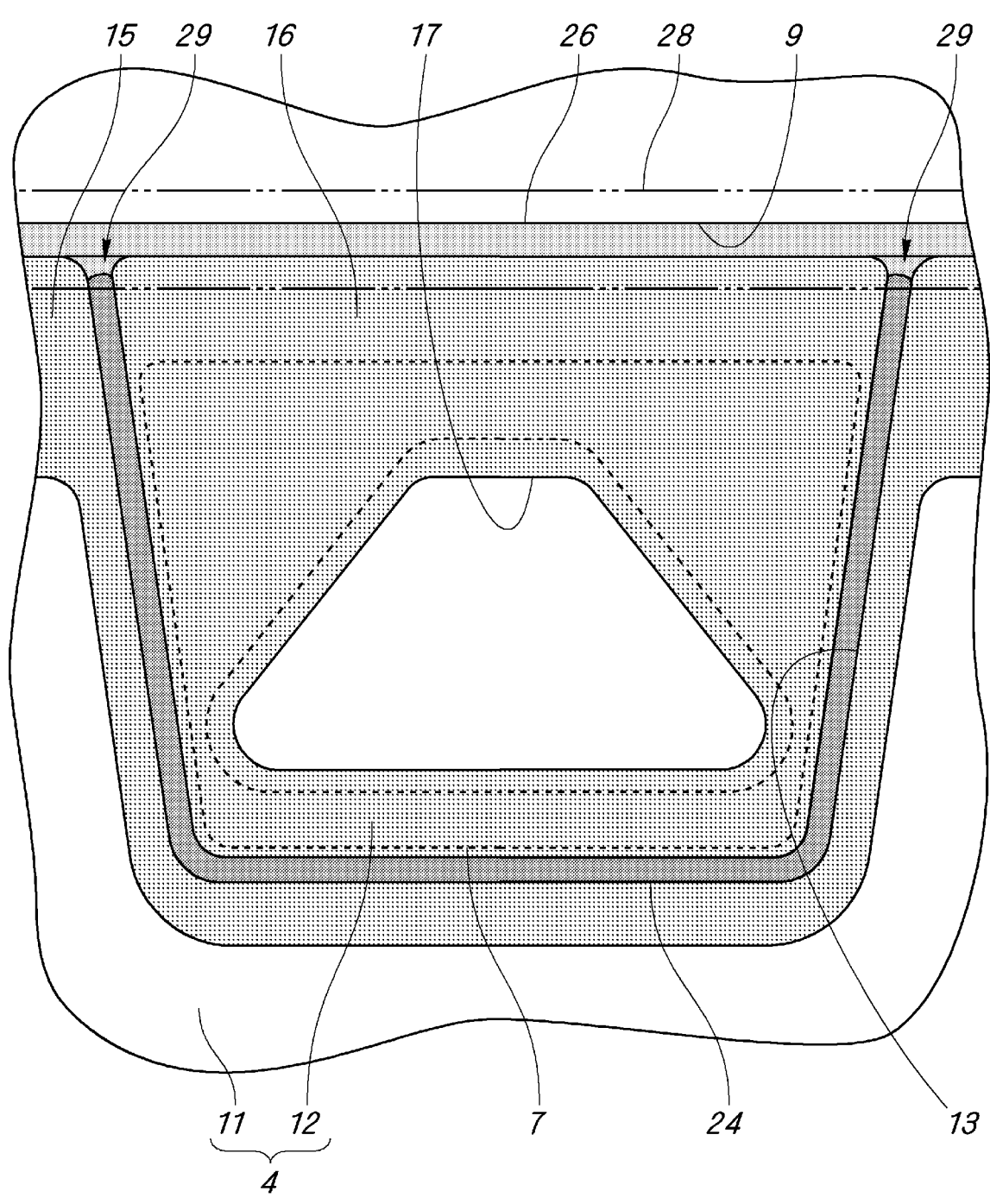
FIG. 6 is a front view showing a main part of the front window of the vehicle according to the second embodiment.
Figure 7A:
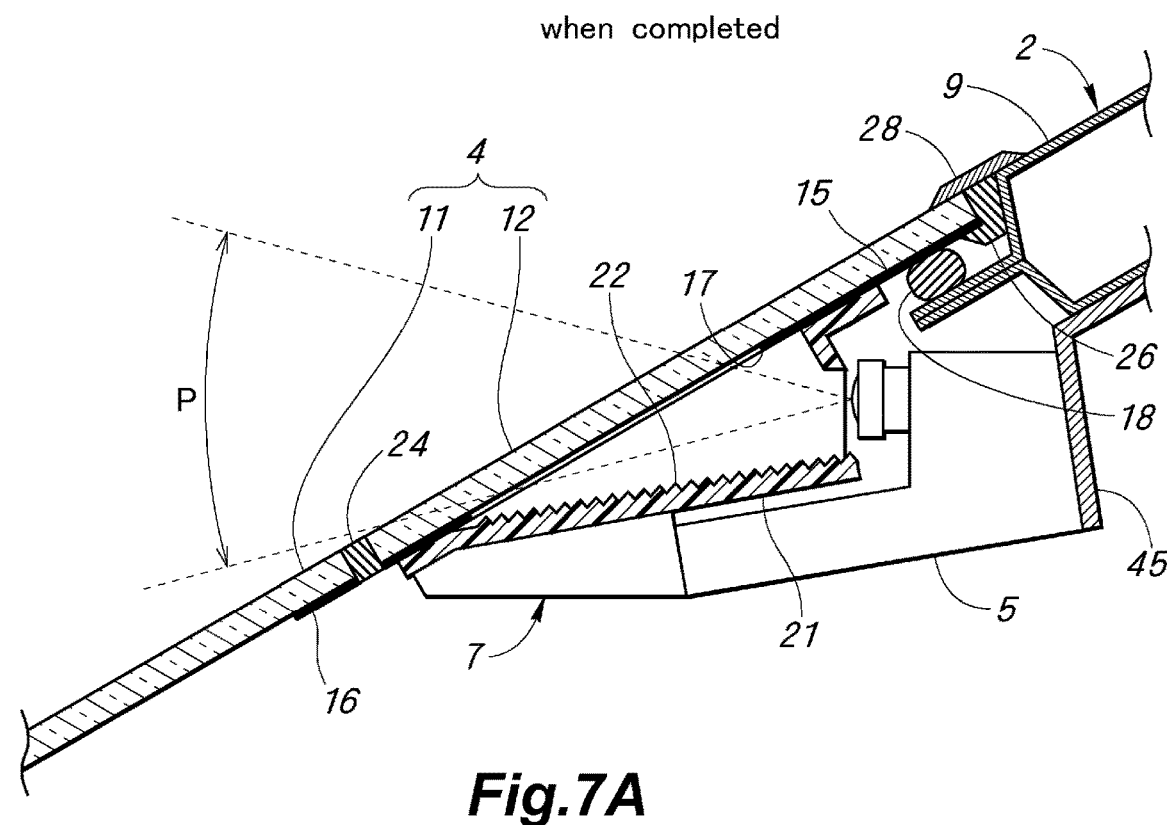
FIGS. 7A and 7B are sectional views showing a main part of the front window of the vehicle according to the second embodiment when completed and during assembly, respectively.
Figure 7B:
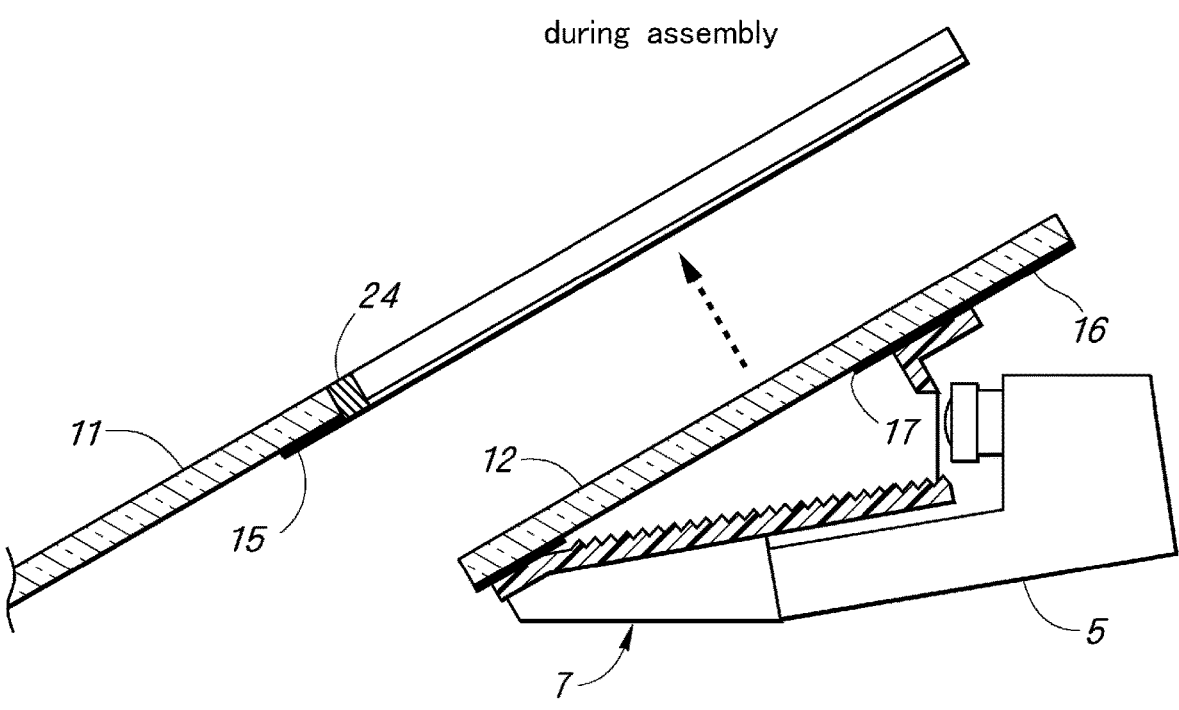

As shown in FIGS. 6 and 7A, in this embodiment, the bracket 7 is fixed to the second window panel 12, and is fixed to the first window panel 11 via the second window panel 12. As shown in FIG. 7B, at the time of assembly, first, the bracket 7 is fixed to the second window panel 12, and then the second window panel 12 and the bracket 7 which are united with each other are fixed to the first window panel 11. At this time, the bracket 7 may be fixed to the second window panel 12 with an adhesive agent, for example.

Also, in the example shown in FIG. 7A, the bracket 7 is fixed to the roof part of the vehicle body 2 via a stay 45. Note that the shape of the stay 45 is only one example, and the stay 45 is not limited to such a shape.

Note that in this embodiment, the bracket 7 is not fixed to the first window panel 11 and is fixed to the second window panel 12, but configuration may be made such that when the second window panel 12 is assembled with the first window panel 11 after the bracket 7 is fixed to the second window panel 12, the bracket 7 is fixed to the first window panel 11.

Third Embodiment

Next, with reference to FIGS. 8 to 9B, a third embodiment of the present invention will be described.

Figure 8:
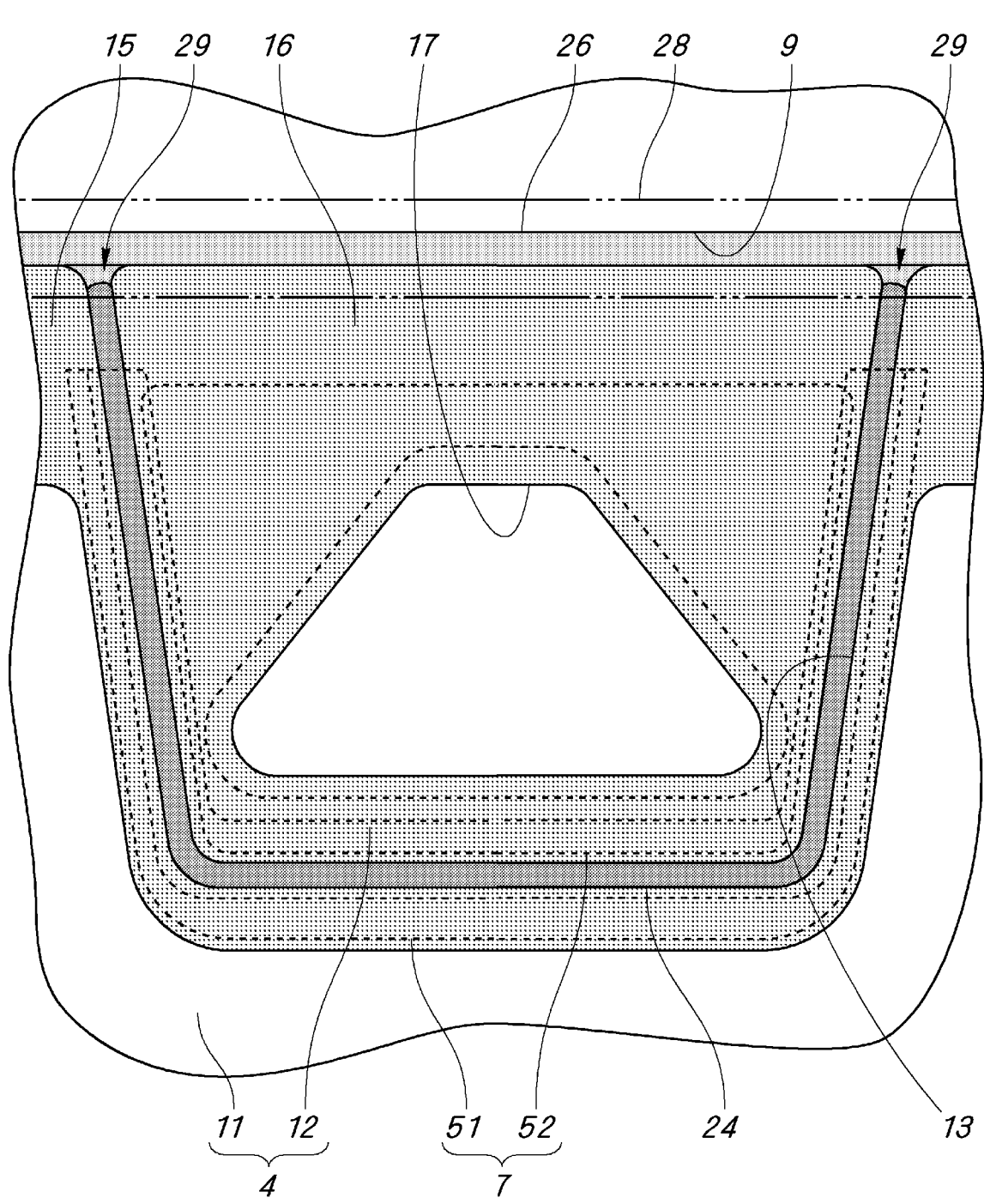
FIG. 8 is a front view showing a main part of the front window of the vehicle according to the third embodiment.
Figure 9A:
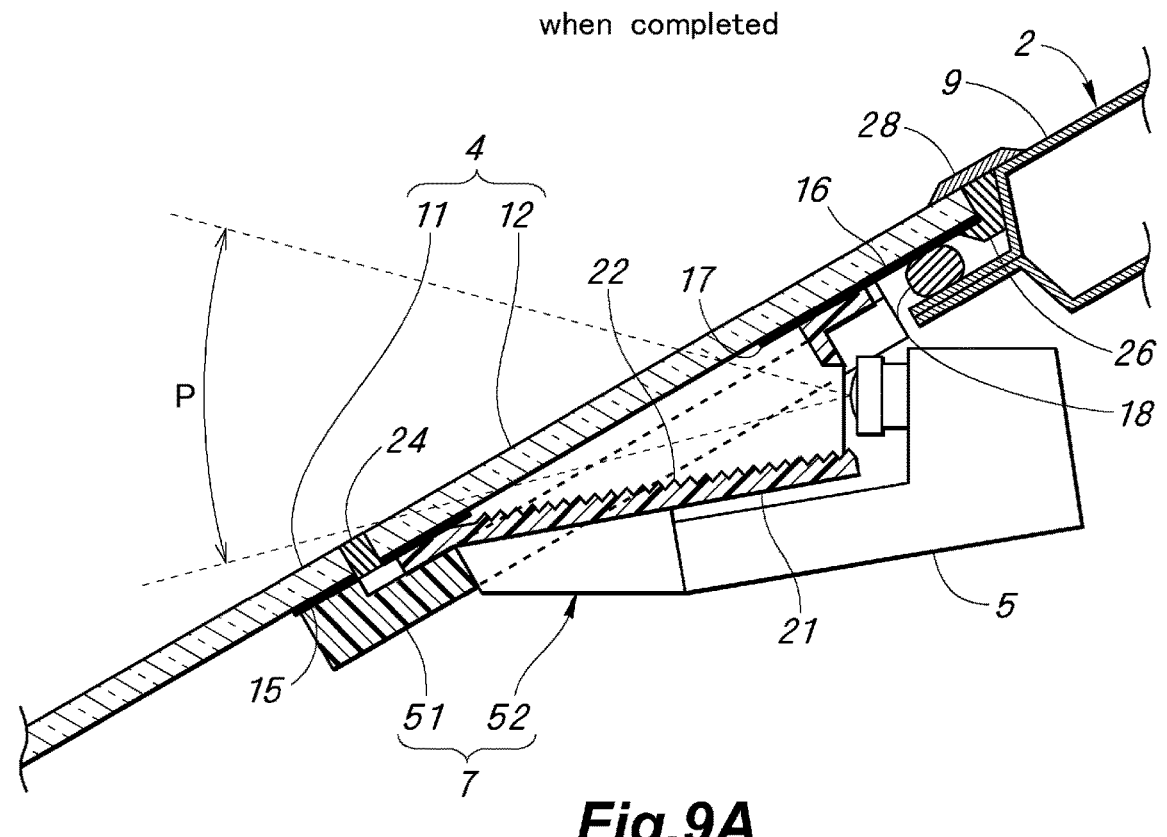
FIGS. 9A and 9B are sectional views showing a main part of the front window of the vehicle according to the third embodiment when completed and during assembly, respectively.
Figure 9B:
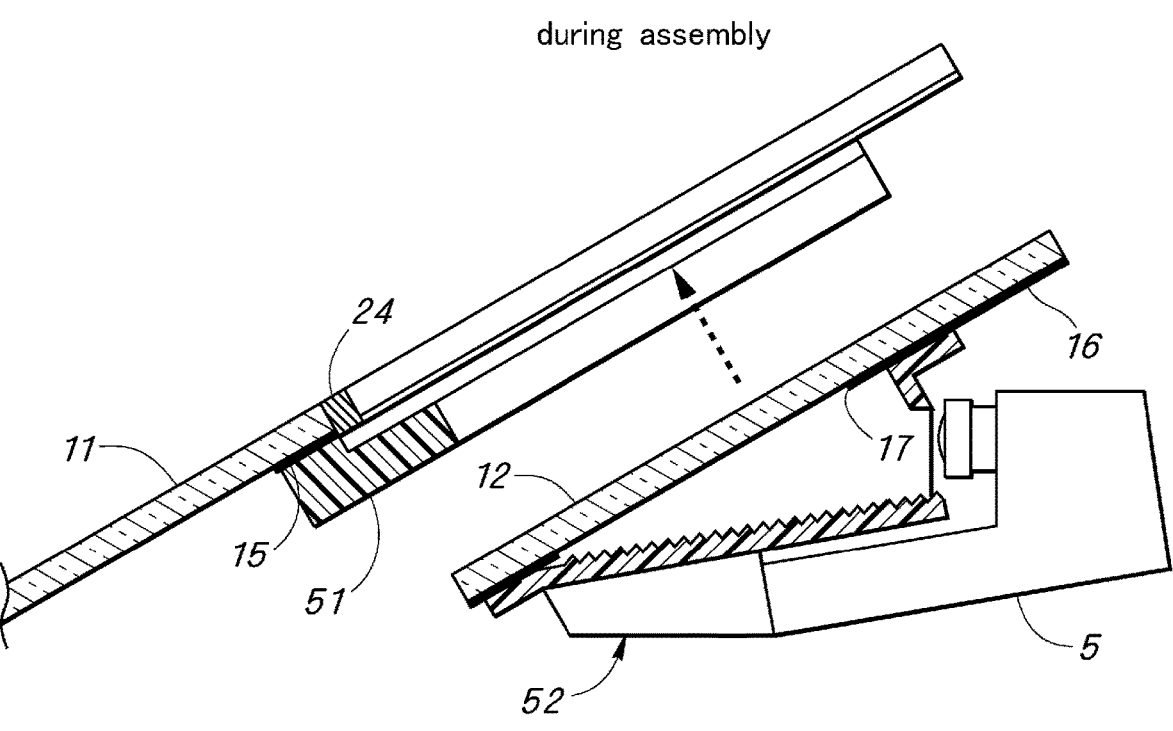

As shown in FIGS. 8 to 9B, in this embodiment, the bracket 7 is composed of a first bracket 51 (an example of a first holding member) and a second bracket 52 (an example of a second holding member). The first bracket 51 is fixed to the inner surface of the first window panel 11. The second bracket 52 is fixed to the inner surface of the second window panel 12. The first bracket 51 and the second bracket 52 are fixed to each other. With the first bracket 51 and the second bracket 52 fixed to each other, the first window panel 11 and the second window panel 12 are united with each other.

Here, the first bracket 51 and the second bracket 52 may be fixed to each other by mutually fitted structures, for example. Also, the first bracket 51 and the second bracket 52 may be fixed to the inner surface of the first window panel 11 and the inner surface of the second window panel 12, respectively, by using an adhesive agent, for example.

Note that the shapes of the first bracket 51 and the second bracket 52 shown in FIGS. 8, 9A, and 9B are only one example, and the first bracket 51 and the second bracket 52 are not limited to them.

Concrete embodiments of the present invention have been described in the foregoing, but the present invention is not limited to the above embodiments, and various modifications and alterations are possible.

The invention claimed is:

1. A vehicle, comprising a front window and a camera disposed on a cabin side of the front window to capture an image of an external environment through the front window, wherein the front window comprises:

a first window panel fitted into a window frame of a vehicle body; and a second window panel formed as a separate member from the first window panel and disposed in an area including a region inside a field of view of the camera, and wherein the second window panel has different properties from the first window panel, the vehicle further comprising a holding member that holds the camera to fix the camera to the vehicle body, wherein the second window panel is united with the first window panel together with the holding member, and the holding member is directly fixed to each of the first window panel and the second window panel.

2. The vehicle according to claim 1, wherein the second window panel has different light transmission properties from the first window panel.

3. The vehicle according to claim 1, wherein the first window panel has a low transmittance of light at specific wavelengths, and the second window panel has a high transmittance of light at the specific wavelengths.

4. The vehicle according to claim 1, further comprising a filling member closing a gap between the first window panel and the second window panel.

5. The vehicle according to claim 1, comprising, as the holding member, a first holding member fixed to the first window panel and a second holding member fixed to the second window panel, wherein the first holding member and the second holding member are joined and fixed to each other so that the first window panel and the second window panel are united with each other.

6. The vehicle according to claim 1, wherein light shielding layers are formed on a part of the first window panel adjacent to the second window panel and a part of the second window panel excluding the region inside the field of view.

* * * * *